US009167045B2

(12) United States Patent
Duan (10) Patent No.: US 9,167,045 B2
(45) Date of Patent: Oct. 20, 2015

(54) METHOD, APPARATUS AND SYSTEM FOR INTERCUTTING ADVERTISEMENT

(71) Applicant: Huawei Technologies Co., Ltd., Shenzhen, Guangdong (CN)

(72) Inventor: Haifeng Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 13/661,725

(22) Filed: Oct. 26, 2012

(65) Prior Publication Data

US 2013/0055307 A1  Feb. 28, 2013

Related U.S. Application Data

(63) Continuation of application No. PCT/CN2010/079336, filed on Dec. 1, 2010.

(30) Foreign Application Priority Data

Apr. 27, 2010  (CN) .......................... 2010 1 0156900

(51) Int. Cl.
*H04N 7/10* (2006.01)
*H04L 29/08* (2006.01)
(Continued)

(52) U.S. Cl.
CPC ............ *H04L 67/20* (2013.01); *H04L 65/4084* (2013.01); *H04N 21/23424* (2013.01); *H04N 21/25891* (2013.01); *H04N 21/812* (2013.01)

(58) Field of Classification Search
CPC ................................................. H04N 21/2668
USPC ............................................... 725/32, 34–36
See application file for complete search history.

(56) References Cited

U.S. PATENT DOCUMENTS 6,006,257 A * 12/1999 Slezak .......................... 725/110
6,317,791 B1 * 11/2001 Cohn et al. .................... 709/227
(Continued)

FOREIGN PATENT DOCUMENTS

CN  101035294 A  9/2007
CN  101075888 A  11/2007
(Continued)

OTHER PUBLICATIONS

International Search Report in corresponding International Patent Application No. PCT/CN2010/079336 (Mar. 10, 2011).
(Continued)

*Primary Examiner* — An Son P Huynh
(74) *Attorney, Agent, or Firm* — Leydig, Voit & Mayer, Ltd.

(57) ABSTRACT

A method of intercutting advertisement disclosed comprises: receiving a playing request message carrying user information and media information from a user terminal; determining whether advertisement needs to be intercut for the user based on the user information and the media information; when it is determined that advertisement needs to be intercut for the user, making a pause in playing a stream media corresponding to the playing request message, obtaining an advertisement stream corresponding to the user information and the media information, and delivering the advertisement stream to the user to play; when it is detected that play of the advertisement stream is finished, sending the playing request message to a stream media server, and forwarding to the user terminal the stream media obtained from the stream media server, corresponding to the playing request message.

13 Claims, 4 Drawing Sheets

(51) Int. Cl.
    *H04N 21/234*     (2011.01)
    *H04N 21/258*     (2011.01)
    *H04N 21/81*      (2011.01)
    *H04L 29/06*      (2006.01)

(56) References Cited

U.S. PATENT DOCUMENTS

| | | | |
|---|---|---|---|
| 7,806,329 B2 * | 10/2010 | Dmitriev et al. | 235/383 |
| 8,645,990 B2 * | 2/2014 | Soukup et al. | 725/34 |
| 2002/0144262 A1 * | 10/2002 | Plotnick et al. | 725/32 |
| 2002/0184047 A1 * | 12/2002 | Plotnick et al. | 705/1 |
| 2003/0149975 A1 | 8/2003 | Eldering et al. | |
| 2005/0038749 A1 | 2/2005 | Fitch et al. | |
| 2006/0212900 A1 * | 9/2006 | Ismail et al. | 725/34 |
| 2008/0040741 A1 * | 2/2008 | Matsumoto | 725/32 |
| 2008/0307454 A1 | 12/2008 | Ahanger et al. | |
| 2009/0046704 A1 * | 2/2009 | Sternam | 370/352 |
| 2009/0063279 A1 | 3/2009 | Ives et al. | |
| 2009/0257435 A1 * | 10/2009 | Karlsson et al. | 370/394 |
| 2009/0260030 A1 | 10/2009 | Karlsson et al. | |
| 2010/0031162 A1 * | 2/2010 | Wiser et al. | 715/747 |
| 2010/0192180 A1 * | 7/2010 | Olague et al. | 725/42 |
| 2010/0228592 A1 * | 9/2010 | Anderson et al. | 705/10 |

FOREIGN PATENT DOCUMENTS

| | | |
|---|---|---|
| CN | 101087404 A | 12/2007 |
| CN | 101198022 A | 6/2008 |
| CN | 101212443 A | 7/2008 |
| CN | 101232490 A | 7/2008 |
| CN | 101247521 A | 8/2008 |
| CN | 101466024 A | 6/2009 |
| CN | 101593328 A | 12/2009 |
| CN | 101626276 A | 1/2010 |
| CN | 101677394 A | 3/2010 |
| EP | 1267572 A2 | 12/2002 |
| RU | 2328830 C2 | 5/2005 |
| RU | 2329614 C2 | 7/2008 |
| WO | 0217591 A2 | 2/2002 |
| WO | WO 2005086865 A2 | 9/2005 |
| WO | WO 2006018685 A2 | 2/2006 |
| WO | WO 2007076504 A2 | 7/2007 |
| WO | WO 2008045666 A1 | 4/2008 |

OTHER PUBLICATIONS

Written Opinion of the International Searching Authority in corresponding International Patent Application No. PCT/CN2010/079336 (Mar. 10, 2011).

1st Office Action in corresponding Chinese Patent Application No. 201010156900.7 (May 6, 2013).

1st Office Action in corresponding European Patent Application No. 10850591.8 (Jul. 17, 2013).

Extended European Search Report in corresponding European Patent Application No. 10850591.8 (Mar. 13, 2013).

* cited by examiner

METHOD, APPARATUS AND SYSTEM FOR INTERCUTTING ADVERTISEMENT

CROSS-REFERENCE TO RELATED APPLICATIONS

This present application is a continuation of International Patent Application No. PCT/CN2010/079336, filed on Dec. 1, 2010, which claims priority to Chinese Patent Application No. 201010156900.7, filed on Apr. 27, 2010, both of which are hereby incorporated by reference in their entireties.

FIELD OF THE INVENTION

The present invention relates to network interconnection technologies, and more particularly, to a method, apparatus and system for intercutting advertisement.

BACKGROUND OF THE INVENTION

In the Internet, the following three modes are usually adopted for intercutting advertisement. In the first mode, a stream media server is used to intercut advertisement, wherein the stream media server needs to embed an advertisement managing module and an advertisement intercutting module therein. The advertisement managing module takes charge of managing advertisement contents and advertisement intercutting strategies. As such, when a terminal user accesses a stream media service, the advertisement intercutting module of the stream media server intercuts a corresponding advertisement segment into an audio and video data stream of the stream media to be transmitted, and transmits them to the terminal user together, according to the advertisement intercutting strategies. In the second mode, a stream media player of a terminal and an advertisement-dedicated stream media server cooperate to intercut advertisement, wherein the stream media player of the terminal embeds an advertisement intercutting module therein, and the advertisement-dedicated stream media server embeds an advertisement strategy managing module and an advertisement content managing module therein. The advertisement-dedicated stream media server is responsible for management and maintenance of advertisement intercutting strategies and advertisement contents, and the advertisement intercutting module in the terminal player obtains the advertisement intercutting strategies from the advertisement-dedicated stream media server and, according to the strategies, interacts with the advertisement-dedicated stream media server to perform the advertisement intercutting during the process of playing the stream media. In the third mode, a stream media proxy is adopted to intercut advertisement. The stream media proxy embeds an advertisement intercutting module, an advertisement strategy managing module and an advertisement content managing module therein. The advertisement strategy managing module takes charge of managing advertisement intercutting strategies, the advertisement content managing module takes charges of managing advertisement contents, and the advertisement intercutting module takes charge of decoding an audio and video stream which is being transmitted in real time according to the advertisement intercutting strategies, and meanwhile according to the advertisement strategies, obtaining the contents to be intercut which, for example, may be a LOGO, a paragraph of text, a picture, or etc, encoding in real time the obtained advertisement contents into the audio and video stream which has already been decoded, and then transmitting them. However, if the first or the second mode described above is adopted to intercut the advertisement in the prior art, it can not be supervised or monitored on the operator side, which is not conductive to the agility and availability of control on the advertisement intercutting; if the third mode is adopted to intercut the advertisement in the prior art, the stream media proxy needs to decode and encode the audio and video stream in real time to intercut the advertisement, which consumes a plenty of CPU resources and has a higher requirement on the hardware of the stream media proxy.

SUMMARY OF THE INVENTION

The embodiments of the present invention provide a method and apparatus for intercutting advertisement, so as to decrease CPU resources to be occupied for intercutting advertisement and requirement on the hardware configuration of the stream media proxy.

To achieve the above objects, the embodiments of the present invention adopt the following technical solutions.

At one aspect, the embodiments of the present invention provide a method of intercutting advertisement, comprising:

receiving a playing request message carrying user information and media information from a user terminal;

determining whether advertisement needs to be intercut for the user based on the user information and the media information;

when it is determined that advertisement needs to be intercut for the user, making a pause in playing a stream media corresponding to the playing request message, obtaining an advertisement stream corresponding to the user information and the media information, and delivering the advertisement stream to the user to play;

when it is detected that play of the advertisement stream is finished, sending the playing request message to a stream media server, and forwarding to the user terminal the stream media obtained from the stream media server to the user terminal, corresponding to the playing request message;.

At another aspect, the embodiments of the present invention provide a stream media proxy, comprising:

a message receiving unit for receiving a playing request message carrying user information and media information from a user terminal;

a determining unit for determining whether advertisement needs to be intercut for the user based on the user information and the media information;

an advertisement intercutting unit for when it is determined that advertisement needs to be intercut for the user, making a pause in playing a stream media corresponding to the playing request message, obtaining an advertisement stream corresponding to the user information and the media information, and delivering the advertisement stream to the user to play,;

a stream media sending unit for, when it is detected that play of the advertisement stream is finished, sending the playing request message to a stream media server, and forwarding to the user terminal the stream media obtained from the stream media server, corresponding to the playing request message.

At yet another aspect, the embodiments of the present invention further provide a system of intercutting advertisement system, comprising a terminal player, a stream media proxy, a advertisement-dedicated stream media server and a stream media server;

the terminal player is used for sending a playing request message carrying user information and media information, and playing a stream media and an advertisement corresponding to the playing request message;

the stream media proxy is used for determining whether advertisement needs to be intercut for the user based on the user information and the media information, and when it is determined that advertisement needs to be intercut for the user, making a pause in playing a stream media corresponding to the playing request message, obtaining an advertisement stream corresponding to the user information and the media information, delivering the advertisement stream to the user to play, and when it is detected that play of the advertisement stream is finished, sending a playing request message to a stream media server, forwarding to the user terminal the stream media corresponding to the playing request message, obtained from the stream media server.

the advertisement-dedicated stream media server is used for providing an advertisement stream for the stream media proxy which is needed by it;

the stream media server is used for providing the stream media corresponding to the playing request message for the terminal player of the user.

The method, apparatus and system for intercutting advertisement provided by the embodiments of the present invention make a stream media proxy adopted in the present invention may intercut advisement stream to a stream media corresponding to the playing request message without encoding and decoding process when intercutting advertisement, by the stream media proxy to receive a playing request message carrying user information and media information from a user terminal, and to determine whether advertisement needs to be intercut for the user based on the user information and the media information, and when it is determined that advertisement needs to be intercut for the user, to make a pause in playing a stream media corresponding to the playing request message and obtain an advertisement stream corresponding to the user information and the media information and deliver the advertisement stream to the user to play, and when it is detected that play of the advertisement stream is finished, to send the playing request message to a stream media server and forward to the user terminal the stream media obtained from the stream media server, corresponding to the playing request message, thus decreasing greatly occupation of CPU resources and requirement on the hardware configuration of the stream media proxy.

DETAILED DESCRIPTION OF THE INVENTION

The method, apparatus and system for intercutting advertisement provided in the embodiments of the present invention are hereinafter described in detail, with reference to the accompanying drawings.

Figure 1:
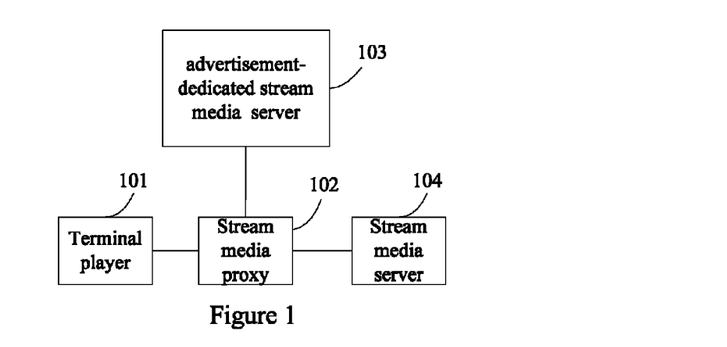
FIG. 1 is a schematic diagram illustrating a structure of a system for intercutting advertisement provided in an embodiment of the present invention.

As illustrated by FIG. 1, an embodiment of the present invention provides a system for intercutting advertisement. The system comprises a terminal player 101, a stream media proxy 102, an advertisement-dedicated stream media server, 103, and a stream media server 104.

The terminal player 101 is used for sending a playing request message carrying user information and media information, and playing a stream media or an advertisement corresponding to the playing request message.

The stream media proxy 102 is used for determining whether advertisement needs to be intercut for the user based on the user information and the media information, and when it is determined that advertisement needs to be intercut for the user, making a pause in playing a stream media corresponding to the playing request message, obtaining an advertisement stream corresponding to the user information and the media information from an advertisement-dedicated stream media server, delivering the advertisement stream to the user to play, and when it is detected that play of the advertisement stream is finished, sending the playing request message to a stream media server, forwarding to the user terminal the stream media obtained from the stream media server, corresponding to the playing request message,.

It is to be explained that the process of making a pause in playing a stream media corresponding to the playing request message may be performed after receiving the playing request message and before playing the stream media actually, or may be performed during the process of the user playing the stream media. Namely, when it is determined that advertisement needs to be intercut for the user, the time of intercutting the advertisement may be before the user playing the stream media, or may be during the process of the user playing the stream media. The specific time point of intercutting the advertisement may be pre-set according to advertisement intercutting strategies.

It is to be explained that the stream media proxy mentioned in the embodiments of the present invention may adopt a display proxy or a transparent proxy. If the display proxy is adopted, IP address and port information of the display proxy need to be set at a stream media player of the terminal. If the transparent proxy is adopted, the IP address and the port information need not to be set at the stream media player of the terminal, but all signallings which need to be sent to the stream media server at the stream media player of the terminal need to be sent to the transparent proxy firstly. For example, when the user terminal needs to access the stream media server, the user terminal should send a packet request message to the display proxy or the transparent proxy firstly, and then the display proxy or the transparent proxy sends the packet request message to the stream media proxy. If the display proxy is adopted to send the packet request message to the stream media server, the source address of the packet request message received at the stream media server side will be the IP address of the display proxy. If the transparent proxy is adopted to send the packet request message to the stream media server, the source address of the packet request message received at the stream media server side will be the IP address of the user terminal.

The advertisement-dedicated stream media server 103 is used for providing the advertisement stream for the stream media proxy which is needed by the stream media proxy;

The stream media server 104 is used for providing a stream media corresponding to the playing request message for the user terminal player.

It is to be noted that the stream media proxy 102 and the advertisement-dedicated stream media server mentioned in the embodiments of the present invention may be both set up on the operator control side. Of course, the stream media proxy 102 may be set up on the operator side alone. Thus it can be realized for the operator to control advertisement playing in the stream media.

Particularly, the advertisement strategies located in the stream media proxy 102 and/or the advertisement contents located in the advertisement-dedicated stream media server 103 may be managed and controlled by the operator.

Figure 2:
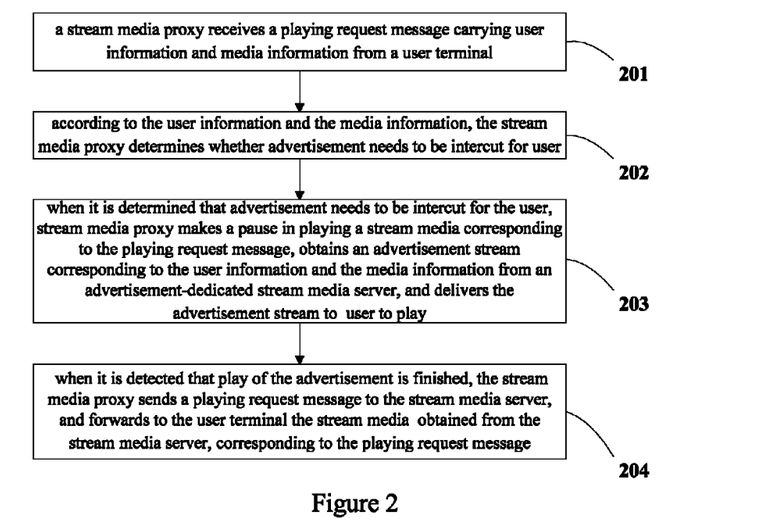
FIG. 2 is a flowchart illustrating a method of intercutting advertisement provided in an embodiment of the present invention.

FIG. 2 illustrates a method of intercutting advertisement provided in an embodiment of the present invention, wherein the method comprises:

201, a stream media proxy receives a playing request message carrying user information and media information from a user terminal, wherein the user information may include IP address of the user terminal, and port information of the user terminal.

The media information may include content of the stream media currently accessed by the user, type of the stream media currently accessed by the user, size of the stream media accessed by the user, and duration of the stream currently accessed by the user.

202, according to the user information and the media information, the stream media proxy determines whether advertisement needs to be intercut for the user. A specific determination process may be that the stream media proxy may determine whether advertisement needs to be intercut according to the user information and the media information and pre-set advertisement strategies in the stream media proxy. For example, according to the user information and the media information in the playing request message sent by the user, the stream media proxy may determine whether the user has ordered an advertisement service. If the user has ordered an advertisement service, the stream media proxy may further use the media information. For example, if the stream media requested by the playing request message sent from the user belongs to a sport class, the stream media proxy may obtain a corresponding sport advertisement to intercut.

203, when it is determined that advertisement needs to be intercut for the user, the stream media proxy makes a pause in playing a stream media corresponding to the playing request message, obtains an advertisement stream corresponding to the user information and the media information from an advertisement-dedicated stream media server, and delivers the advertisement stream to the user to play. Particularly, the stream media proxy determines the type or content of the advertisement which needs to be intercut for the user, and the stream media server obtains, according to the determination result, a uniform resource locator corresponding to the type or the content of advertisement which needs to be intercut for the user, and makes a pause in sending the start playing request message to the stream media server, or sends a pause playing request message to the stream media server; and then according to the uniform resource locator, obtains the advertisement stream corresponding to the user information and the media information from the advertisement-dedicated stream media server, and delivers the obtained advertisement stream to the user to play.

204, when it is detected that play of the advertisement is finished, the stream media proxy sends a playing request message to the stream media server, and forwards to the user terminal the stream media corresponding to the playing request message, obtained from the stream media server. A specific implementation is that the stream media proxy detects whether the play of the advertisement stream is finished by, for example, performing a judgement according to the finishing point of the play of the advertisement stream, or performing a judgement according to the duration of the play of the advertisement stream, or the like. When it is detected that the play of the advertisement stream is finished, the stream proxy sends a start playing request or a continual playing request to the stream media server, obtains the stream media corresponding to the continual playing request, and delivers the obtained stream media to the user to play. Whether the stream media proxy sends the start playing request message or the continual playing request message to the stream media server depends mainly on the time of intercutting the advertisement stream. If the time of intercutting the advertisement stream is during the process of the terminal player playing the stream media, when it is detected that the play of the advertisement stream is finished, the stream media proxy sends the continual playing request to the stream media server. If the time of intercutting the advertisement stream is before the time of the terminal player playing the stream media, when it is detected that the play of advertisement stream is finished, the stream media proxy sends the start playing request to the stream media server.

It is to be noted that the method in the embodiments of the present invention may further comprise the following steps:

when it is determined that no advertisement needs not to be intercut for the user, the stream media proxy forwards the playing request message carrying the user information and the media information to the stream media server;

the stream media proxy obtains the stream media corresponding to the playing request message from the stream media server; and the stream media proxy delivers the obtained stream media to the user.

Based on the aforesaid embodiments, the terminal player at the user side may intercut advertisement before playing the stream media, and may otherwise intercut advertisement during the process of playing the stream media, wherein the specific time point of intercutting the advertisement may be pre-set according to specific requirements. The two situations mentioned above will be explained in detail as below.

Figure 3:
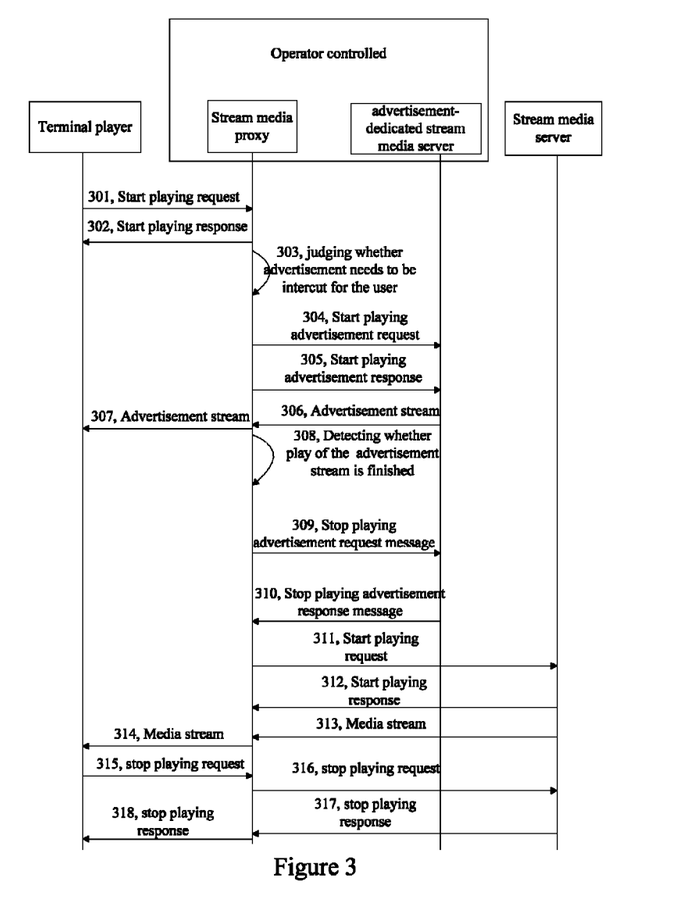
FIG. 3 is a flowchart illustrating the specific implementation of a method of intercutting advertisement provided in an embodiment of the present invention.

When the terminal player at the user side intercuts advertisement before playing formally the stream media corresponding to the start playing request message sent thereby, as shown in FIG. 3, a specific implementation process of the method of intercutting advertisement provided in the embodiments of the present invention comprises:

301, the terminal player initiates a start playing request message for a stream media to the stream media proxy, wherein the start playing request message for the stream media carries user information and media information. The user information may include IP address of the user terminal and port information of the user terminal, and the media information includes content of the stream media currently accessed by the user, type of the stream media currently accessed by the user, size of the stream media currently accessed by the user, and the duration of the stream media currently accessed by the user.

It is to be noted that the stream media proxy may, according to the user information, query a number of the user terminal, a subscription status of advertisement agreement for the user terminal, and category, age, occupation, interests and preferences of the user, among other information, from a database of a service system of the operator.

302, the stream media proxy processes the request message, and returns a start playing response message.

303, at a pre-set time point, the stream media proxy determines whether the user advertisement needs to be intercut for the user, based on the user information and the media information. Particularly, the stream media proxy queries from the advertisement strategy module thereof whether advertisement needs to be intercut and the URL (Uniform/Universal Resource Locator, Uniform/Universal Resource Locator) corresponding to the advertisement stream to be intercut, according to the IP address of the user terminal, the port information of the user terminal, and the number of the user terminal, in connection with the subscription status of advertisement agreement for the user terminal, the category, the age, the occupation, the interests and preferences of the user and the content of the stream media currently accessed by the user, the type of the stream media currently accessed by the user, the size of the stream media currently accessed by the user, the duration of the stream media currently accessed by the user, or the like. For example, the stream media proxy may determine whether the user has subscribed an advertisement service according to the subscription status of advertisement agreement for the user terminal in the playing request message sent by the user. If the user has subscribed an advertisement service, the stream media proxy may further query the URL corresponding to the advertisement stream to be intercut from the advertisement strategy module thereof, according to the interests and preferences of the user, the content of the stream media currently accessed by the user, the type the stream media currently accessed by the user, the size of the stream media currently accessed by the user, the duration of the stream media currently accessed by the user, or the like.

304, according to the queried URL corresponding to the advertisement stream to be intercut, the stream proxy initiates a start playing advertisement request message to the advertisement-dedicated stream media server in behalf of the terminal player, wherein the message carries the URL corresponding to the advertisement stream, and the URL is the one which is queried from the advertisement strategy module in the step of 303.

305, the advertisement-dedicated stream media server processes the start playing advertisement request message, and returns a corresponding start playing advertisement response message.

306, the advertisement-dedicated stream media server delivers an advertisement stream corresponding to the URL.

307, the stream media proxy forwards the advertisement stream.

308, the stream media proxy detects whether play of the advertisement stream is finished.

309, when it is detected that the play of the advertisement playing is finished, the stream media proxy initiates a stop playing advertisement request message to the advertisement-dedicated stream media server in behalf of the terminal player.

310, the advertisement-dedicated stream media server processes the stop playing advertisement stream request, and returns a corresponding stop playing advertisement response message to the stream media proxy.

311, after receiving the stop playing advertisement stream response message, the stream media proxy initiates a start playing request message to the stream media server.

312, the stream media server processes the start playing request message, and returns a corresponding start playing response message to the stream media server.

313, after receiving the response message, the stream media server continually delivers, from the stream media position indicated by the pause playing request message, the stream media corresponding to the playing request message to the stream media proxy.

314, the stream media proxy forwards the received stream media to the terminal player.

315, when detecting a user-clicking stop playing event or a stream media playing finished event, the terminal player sends a stop playing request message to the stream media proxy.

316, the stream media proxy forwards the stop playing request message to the stream media server.

317, the stream media server processes the stop playing request message, and returns a corresponding response message to the stream media proxy.

318, the stream media proxy forwards the stop playing response message to the terminal player.

Figure 4:
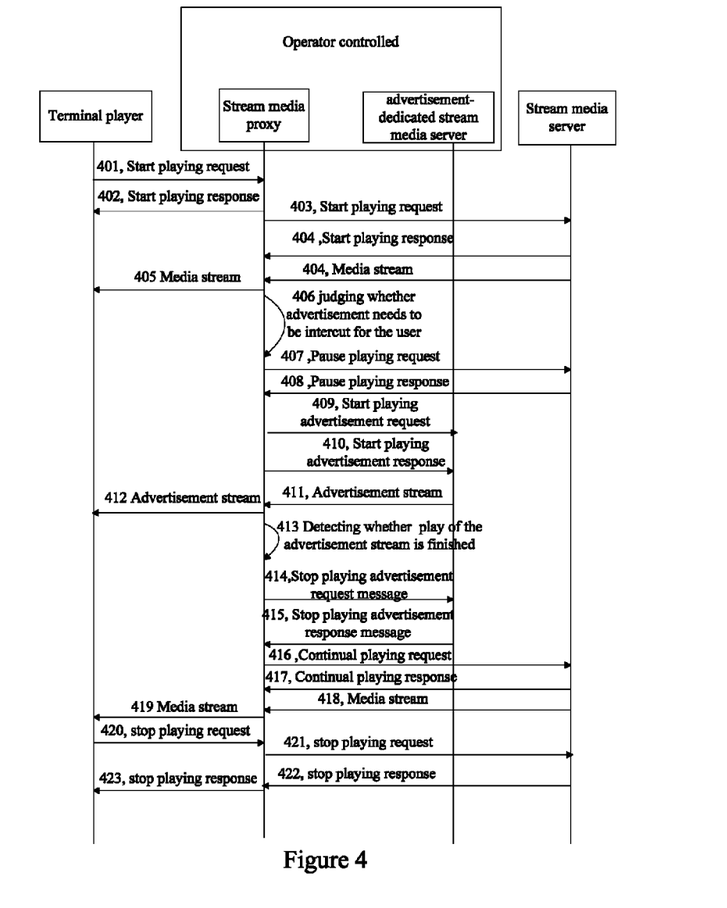
FIG. 4 is a flowchart illustrating the specific implementation of another method of intercutting advertisement provided in an embodiment of the present invention.

When the terminal player at the user side intercuts advertisement during the process of playing stream media, as shown in FIG. 4, a specific implementation process of the method of intercutting advertisement provided in the embodiments in the present invention comprises:

401, the terminal player initiates a start playing request message of a stream media to the stream media proxy, wherein the start playing request message of the stream media carries user information and media information. The user information may include IP address of the user terminal, and port information of the user terminal, and the media information may include content of the stream media currently accessed by the user, type of the stream media currently accessed by user, size of the stream media currently accessed by the user and duration of the stream media currently accessed by the user.

It is to be noted that the stream media proxy may, according to the user information, query a number of the user terminal, a subscription status of advertisement agreement for the user terminal, and category, age, occupation, interests and preferences of the user, among other information, from a database of a service system of the operator.

402, the stream media proxy processes the request message, and returns a corresponding start playing request response message to the terminal player.

403, the stream media proxy forwards the start playing request message to the stream media server.

404, the stream media server returns a corresponding start playing request response message and a stream media corresponding to the start playing request message to the stream media proxy.

405, the stream media proxy forwards the stream media.

406, at a pre-set time point, the stream media proxy determines whether advertisement needs to be intercut for the user based on the user information and the media information. Particularly, the stream media proxy queries from the advertisement strategy module thereof whether advertisement needs to be intercut and the URL (Uniform/Universal Resource Locator, Uniform/Universal Resource Locator) corresponding to the advertisement stream to be intercut, according to the IP address of the user terminal, the port information of the user terminal, the number of the user terminal, the subscription status of advertisement agreement for the user terminal, the category, the age, the occupation, the interests and preferences of the user and the content of the stream media currently accessed by the user, the type of the stream media currently accessed by the user, the size of the stream media currently accessed by the user, the duration of the stream media currently accessed by the user, or the like.

407, if the stream media proxy determines that advertisement needs to be intercut, it initiates a pause playing request message to the stream media server in behalf of the terminal player.

408, after receiving the pause playing request message, the stream media server returns a pause playing response message to the stream media proxy.

409, after receiving the response message of the stream media server, the stream media proxy, according to the URL corresponding to the advertisement stream to be intercut which is queried by the stream media proxy, initiates a start playing advertisement request message to the advertisement-dedicated stream media server in behalf of the terminal player, wherein the message carries the URL corresponding to advertisement stream and the URL is the one which is queried from advertisement strategy module in the step of 406.

410, the advertisement-dedicated stream media server processes the start playing advertisement request message, and returns a corresponding start playing advertisement response message.

411, the advertisement-dedicated stream media server delivers an advertisement stream corresponding to the URL.

412, the stream media proxy forwards the advertisement stream.

413, the stream media proxy detects whether play of the advertisement is finished.

414, when it is detected that the play of the advertisement stream is finished, the stream proxy initiates a stop playing advertisement request message to the advertisement-dedicated stream media server in behalf of the terminal player.

415, the advertisement-dedicated stream media server processes the stop playing advertisement stream request, and returns a corresponding stop playing advertisement response message to the stream media proxy.

416, after receiving the stop playing advertisement stream response message, the stream media proxy initiates a continual playing request message to the stream media server, so as to continually deliver the stream media from stream media position of the pause playing request message being sent.

417, the stream media server processes the continual playing request message, and returns a corresponding continual playing response message to the stream media server.

418, after receiving the response message, the stream media server continually delivers the stream media corresponding to the playing request message from the stream media position indicated by the pause playing request message.

419, the stream media proxy forwards the received stream media to the terminal player.

420, when detecting a user-clicking stop playing event or a stream media playing finished event, the terminal player sends a stop playing request message to the stream media proxy.

421, the stream media proxy forwards the stop playing request message to the stream media server.

422, the stream media server processes the stop playing request message, and returns a corresponding response message to the stream media proxy.

423, the stream media proxy forwards the stop playing response message to the terminal player.

It is to be noted that in the method of intercutting advertisement illustrated in FIG. 3 and FIG. 4, the stream media proxy may determine at a pre-set time point (e.g. before or during the process of the terminal player at the user side formally playing the stream media corresponding to the start playing request message sent thereby) whether advertisement needs to be intercut based on the user information and the media information. The stream media proxy may also determine a time point of intercutting the advertisement according to advertisement intercutting strategies, make a pause in playing a stream media corresponding to the playing request message at the determined time point of intercutting the advertisement, obtain an advertisement stream corresponding to the user information and the media information, and deliver the advertisement stream to the user to play. For example, after receiving the start playing request message sent by the terminal player at the user side, the stream media proxy immediately determines whether advertisement needs to be intercut for the user. When it is determined that advertisement needs to be intercut, the time point of intercutting advertisement is further determined. As such, the stream media proxy may make, according to the determined time point of intercutting the advertisement, a pause in playing the stream media corresponding to the playing request message, obtain the advertisement stream corresponding to the user information and the media information, and deliver the advertisement stream to the user to play.

Figure 5:
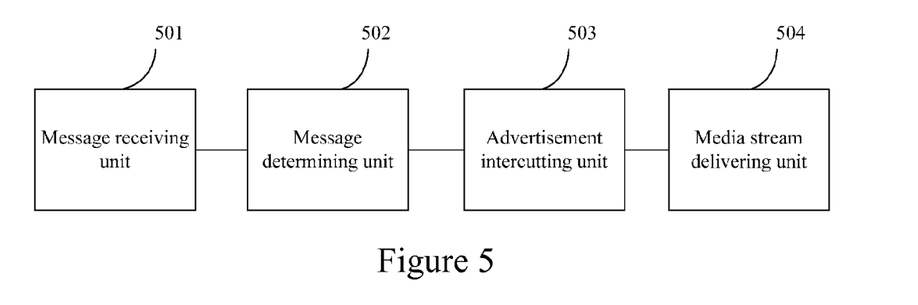
FIG. 5 is a schematic diagram illustrating a structure of an apparatus for intercutting advertisement provided in an embodiment of the present invention.

FIG. 5 illustrates a stream media proxy provided in the embodiments of the present invention, the stream media proxy comprising:

a message receiving unit 501 for receiving a playing request message carrying user information and media information from a user terminal;

a determining unit 502 for determining whether advertisement needs to be intercut for the user based on the user information and the media information;

an advertisement intercutting unit 503 for when it is determined that advertisement needs to be intercut for the user, making a pause in playing a stream media corresponding to the playing request message, obtaining an advertisement stream corresponding to the user information and the media information, and delivering the advertisement stream to the user to play; and a stream media delivering unit 504 for when it is detected that play of the advertisement stream is finished, sending a playing request message to a stream media server, and forwarding to the user terminal the stream media obtained from the stream media server, corresponding to the playing request message,.

It is to be noted that the stream media proxy may further comprise:

a message forwarding unit for when it is determined that advertisement needs to be intercut for the user, forwarding the playing request message carrying the user information and the media information to the stream media server;

a stream media obtaining unit for obtaining the stream media corresponding to the playing request message from the stream media server; and the stream media delivering unit further for delivering the obtained stream media to the user.

In particular, the advertisement intercutting unit 503 may comprise:

a information obtaining subunit for when it is determined that advertisement needs to be intercut for the user, obtaining a uniform resource locator corresponding to the advertisement stream which needs to be intercut for the user;

a message sending subunit for sending a pause playing request message to the stream media server;

an advertisement obtaining subunit for obtaining, according to the uniform resource locator, the advertisement stream corresponding to the user information and the media information from a advertisement-dedicated stream media server; and an advertisement delivering subunit for delivering the obtained advertisement stream to the user to play.

In particular, the stream media delivering unit 504 may comprise:

a detecting subunit for detecting whether play of the advertisement playing is finished;

a message sending subunit for, when it is detected that the play of the advertisement is finished, sending a start playing request or a continual playing request to the stream media server;

a stream media obtaining subunit for obtaining the stream media corresponding to the continual playing request; and a stream media delivering subunit for delivering the obtained stream media to the user to play.

The method, apparatus and system for intercutting advertisement provided by the embodiments of the present invention make a stream media proxy adopted in the present invention may intercut advisement stream to a stream media corresponding to the playing request message without encoding and decoding process when intercutting advertisement, by the stream media proxy to receive a playing request message carrying user information and media information from a user terminal, and to determine whether advertisement needs to be intercut for the user based on the user information and the media information, and when it is determined that advertisement needs to be intercut for the user, to make a pause in playing a stream media corresponding to the playing request message and obtain an advertisement stream corresponding to the user information and the media information and deliver the advertisement stream to the user to play, and when it is detected that play of the advertisement stream is finished, to send the playing request message to a stream media server and forward to the user terminal the stream media corresponding to the playing request message, obtained from the stream media server, thus decreasing greatly occupation of CPU resources and requirement on the hardware configuration of the stream media proxy. Since it is not necessary for the stream media proxy in the present invention to encode or decode an original audio/video stream of stream media, software for the stream media proxy does not need to be upgraded after a new media format is added, which decreases costs for upgrade and maintenance thereafter. Since the present invention can intercut an entire advertisement clip, and the original audio/video stream is in pause during the process of the advertisement clip being played, the advertisement information content pushed by the present invention is more abundant.

Through the above description of the implementation, those skilled in the art can understand that all of or part of the steps of the embodiment methods described above may be implemented by instructing relevant hardware by program. The program may be stored in a computer-readable storage medium. The program comprises the steps of above method embodiments when running The storage medium may be ROM/RAM, a magnetic disk, an optical disk, or the like.

The foregoing is only some specific embodiments of the invention without limitation to the protection scope of the invention. It is easy for those skilled in the art to preconceive changes or substitutions within the technical scope disclosed by the invention, which should fall in the protection scope of the invention. Therefore, the protection scope of the present invention should be defined by that of the claims.

What is claimed is:

1. A method of intercutting an advertisement, comprising:
receiving, by a stream media proxy, a playing request message carrying user information and media information from a user terminal;
determining, by the stream media proxy, whether the advertisement needs to be intercut for a user based on the user information and the media information;
when it is determined that the advertisement needs to be intercut for the user, sending, by the stream media proxy, a pause playing request message to a stream media server to make a pause in playing a stream media corresponding to the playing request message, obtaining, from an advertisement-dedicated stream media server, an advertisement stream corresponding to the user information and the media information, and delivering the advertisement stream to the user to play; and
when it is detected that the advertisement stream is finished, sending, by the stream media proxy, the playing request message to the stream media server, and forwarding to the user terminal the stream media corresponding to the playing request message, obtained from the stream media server;
wherein:
the user information comprises an IP address of the user terminal and port information of the user terminal; and
the media information comprises content of the stream media currently accessed by the user, type of the stream media currently accessed by the user, size of the media stream currently accessed by the user, and duration of the media stream currently accessed by the user.

2. The method according to claim 1, wherein the determination of whether the advertisement needs to be intercut for the user based on the user information and the media information comprises:
at a pre-set time point, determining whether the advertisement needs to be intercut for the user based on the user information and the media information.

3. The method according to claim 1, further comprising:
when it is determined that the advertisement needs to be intercut based on the user information and the media information, determining, according to an advertisement intercutting strategy, a time point for intercutting the advertisement, making a pause in playing the stream media corresponding to the playing request message at the determined time point for intercutting the advertisement, obtaining the advertisement stream corresponding to the playing request message, and delivering the advertisement stream to the user to play.

4. The method according to claim 1, further comprising:
when it is determined that no advertisement needs to be intercut for the user, forwarding the playing request message carrying the user information and the media information to the stream media server;
obtaining the stream media corresponding to the playing request message from the stream media server; and
delivering the obtained stream media to the user.

5. The method according to claim 4, wherein obtaining, from an advertisement-dedicated stream media server, an advertisement stream corresponding to the user information and the media information, and delivering the advertisement stream to the user to play, comprises:
obtaining a uniform resource locator corresponding to the advertisement stream which needs to be intercut for the user;
obtaining, according to the uniform resource locator, the advertisement stream corresponding to the user information and the media information from the advertisement- dedicated stream media server; and
delivering the obtained advertisement stream to the user to play.

6. The method according to claim 5, wherein when it is detected that the advertisement stream is finished, sending, by the stream media proxy, the playing request message to the stream media server, and
forwarding to the user terminal the stream media corresponding to the playing request message, obtained from the stream media server comprises:

detecting whether the advertisement stream is finished;
when it is detected that the advertisement stream is finished, sending a start playing request to the stream media server;
obtaining the stream media corresponding to the start playing request; and
delivering the obtained stream media to the user to play.

7. The method according to claim 1, wherein the stream media proxy is disposed on an operator side so that an operator controls the advertisement playing in the stream media.

8. A stream media proxy, comprising:
a message receiving unit for receiving a playing request message carrying user information and media information from a user terminal;
a determining unit for determining whether an advertisement needs to be intercut based on the user information and the media information;
an advertisement intercutting unit for when it is determined that the advertisement needs to be intercut for a user, sending, by the stream media proxy, a pause playing request message to a stream media server to make a pause in playing a stream media corresponding to the playing request message, obtaining from an advertisement-dedicated stream media server an advertisement stream corresponding to the user information and the media information, and delivering the advertisement stream to the user to play; and
a stream media delivering unit for when it is detected the advertisement stream is finished, sending the playing request message to the stream media server, and forwarding to the user terminal the stream media obtained from the stream media server, corresponding to the playing request message;
wherein:
the user information comprises an IP address of the user terminal and port information of the user terminal; and
the media information comprises content of the stream media currently accessed by the user, type of the stream media currently accessed by the user, size of the media stream currently accessed by the user, and duration of the media stream currently accessed by the user.

9. The stream media proxy according to claim 8, further comprising:
a message forwarding unit for when it is determined that the advertisement does not need to be intercut for the user, forwarding the playing request message carrying the user information and the media information to the stream media server;
a stream media obtaining unit for obtaining the stream media corresponding to the playing request message from the stream media server; and
the stream media delivering unit further for delivering the obtained stream media to the user terminal.

10. The stream media proxy according to claim 8, wherein the advertisement intercutting unit comprises:

an information obtaining subunit for when it is determined that the advertisement needs to be intercut for the user, obtaining a uniform resource locator corresponding to the advertisement stream which needs to be intercut for the user;
a message sending subunit for sending a pause playing request message to the stream media server;
an advertisement obtaining subunit for obtaining, according to the uniform resource locator, the advertisement stream corresponding to the user information and the media information from an advertisement-dedicated stream media server; and
an advertisement delivering subunit for delivering the obtained advertisement stream to the user to play.

11. The stream media proxy according to claim 10, wherein the stream media delivering unit comprises:
a detecting subunit for detecting whether the advertisement is finished;
a message sending subunit for when it is detected that the advertisement is finished, sending a start playing request or a continual playing request to the stream media server;
a stream media obtaining subunit for obtaining stream media corresponding to the start playing request or the continual playing request; and
a stream media delivering subunit for delivering the obtained stream media to the user to play.

12. The stream media proxy according to claim 8, wherein the stream media proxy is disposed on an operator side so that an operator controls the advertisement playing in stream media.

13. A system for intercutting an advertisement, comprising a terminal player, a stream media proxy according to claim 8, an advertisement-dedicated stream media server and a stream media server, wherein:
the terminal player for sending a playing request message carrying user information and media information, and playing stream media and an advertisement corresponding to the playing request message;
the advertisement-dedicated stream media server for providing the advertisement stream for the stream media proxy; and
the stream media server for providing the stream media corresponding to the playing request message for the terminal player of the user;
wherein:
the user information comprises an IP address of the user player and port information of the user player; and
the media information comprises content of the stream media currently accessed by the user, type of the stream media currently accessed by the user, size of the media stream currently accessed by the user, and duration of the media stream currently accessed by the user.

* * * * *

UNITED STATES PATENT AND TRADEMARK OFFICE
CERTIFICATE OF CORRECTION

| | | |
|---|---|---|
| PATENT NO. | : 9,167,045 B2 | Page 1 of 1 |
| APPLICATION NO. | : 13/661725 | |
| DATED | : October 20, 2015 | |
| INVENTOR(S) | : Duan | |

It is certified that error appears in the above-identified patent and that said Letters Patent is hereby corrected as shown below:

In the Claims
Column 14, line 48, "player" should read -- terminal, --.

Signed and Sealed this
Twenty-third Day of February, 2016

Michelle K. Lee
*Director of the United States Patent and Trademark Office*